Patented Feb. 3, 1925.

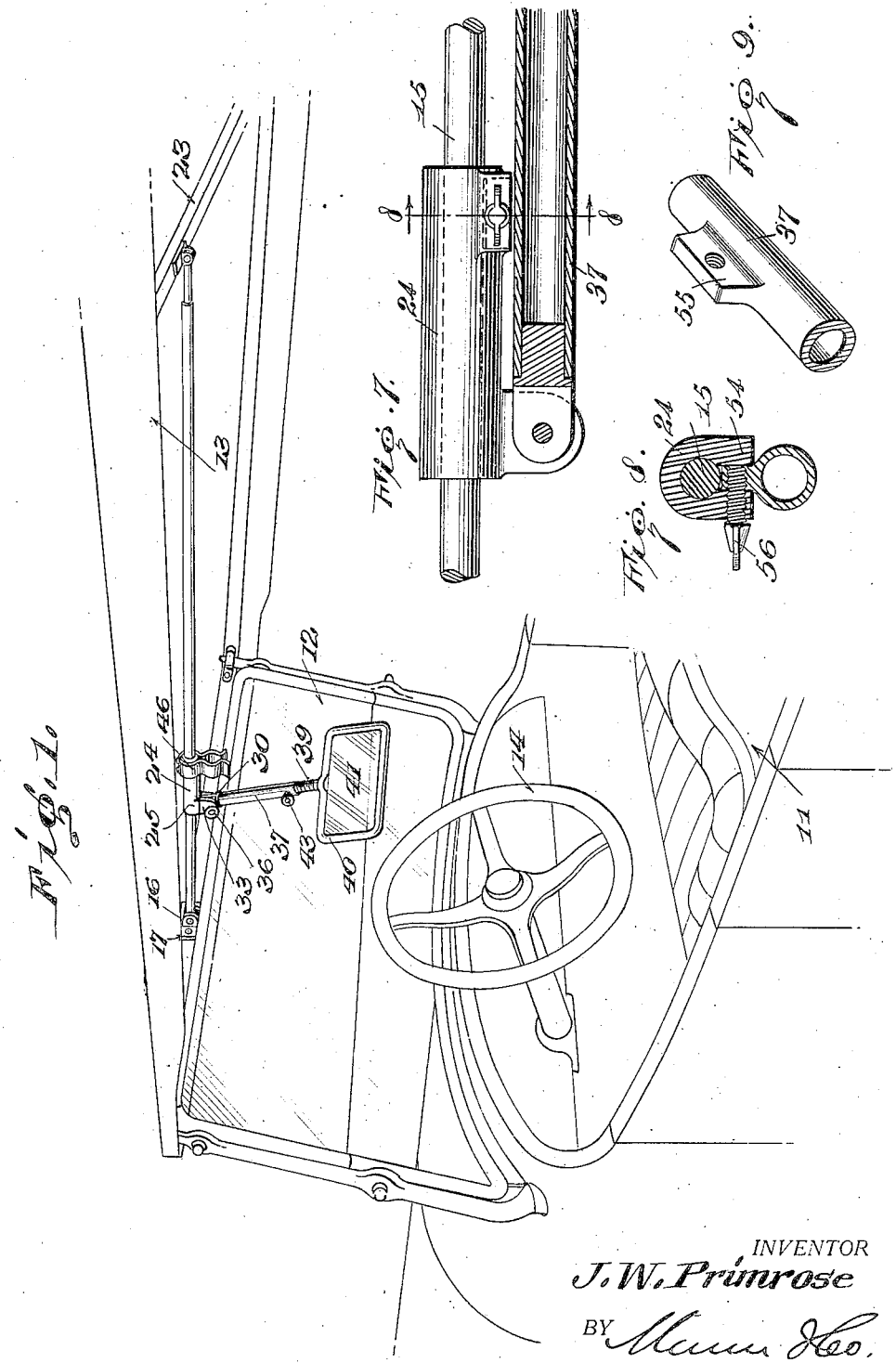

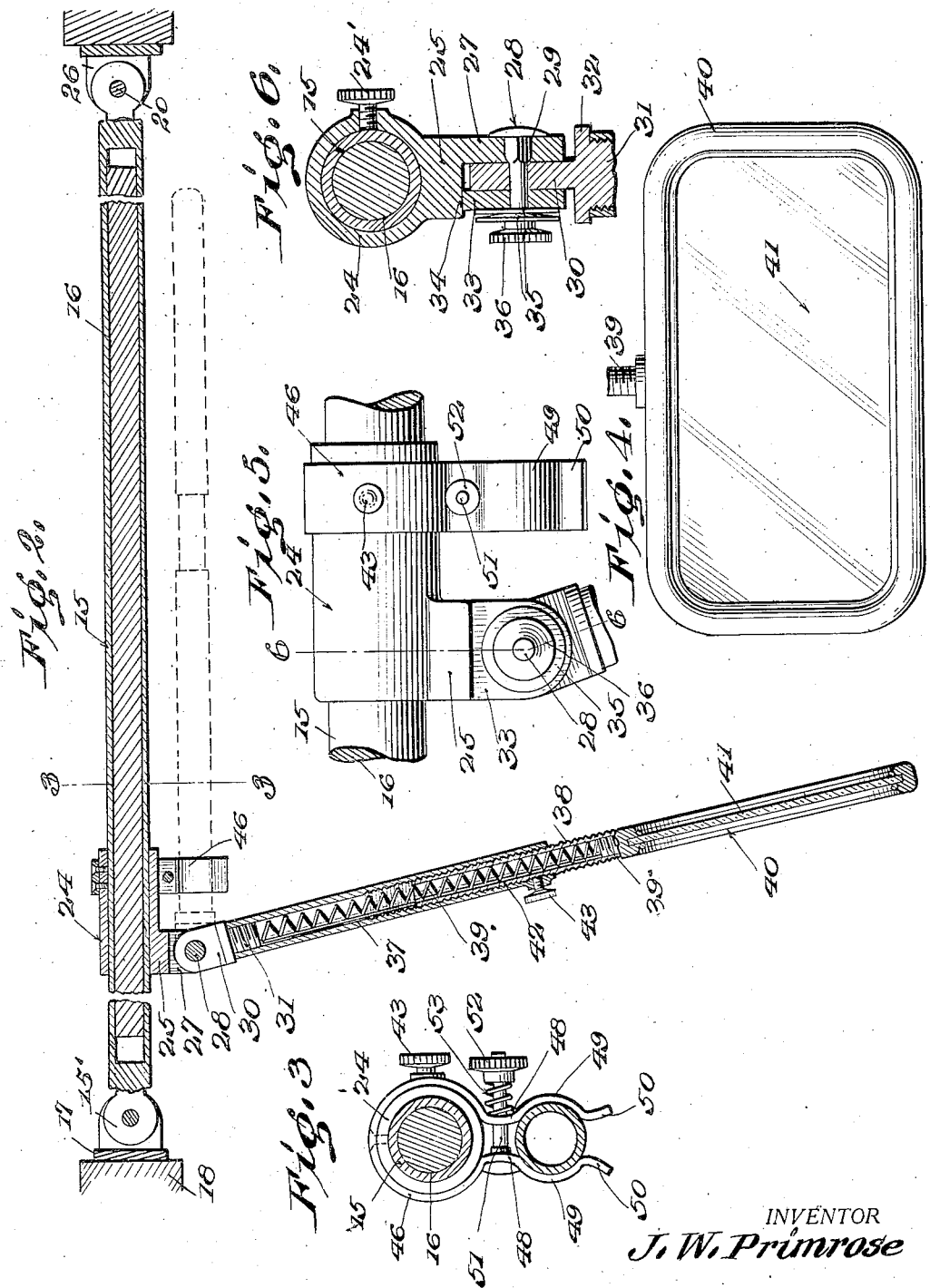

1,525,043

UNITED STATES PATENT OFFICE.

JOHN WILLIAM PRIMROSE, OF CLARKSDALE, MISSISSIPPI.

EYESHIELD ATTACHMENT.

Application filed November 16, 1923. Serial No. 675,162.

*To all whom it may concern:*

Be it known that I, JOHN W. PRIMROSE, a citizen of the United States, residing at Clarksdale, in the county of Coahoma, State of Mississippi, have invented certain new and useful Improvements in Eyeshield Attachments, of which the following is a specification.

This invention relates to an eye shield attachment for motor vehicles. The present invention more particularly relates to improvements upon my Patent No. 1,461,289 issued July 10, 1923.

In my patent referred to there is shown an eye shield depending from the top of a motor vehicle and positioned immediately forward to the driver of the motor vehicle or in other words in the line of vision of said driver, and this shield is adjustably supported so that the same may be brought to any position desired.

The object of the present invention is to provide means whereby the shield may be moved to an unobstructing position when not in use.

It is also an object of the invention that means be provided whereby the present shield may be attached to any form of motor vehicle top.

It is a further object of the invention to provide means whereby the shield will be rigidly held in its adjusted position.

Other objects, and objects relating to details of construction, combination and arrangement of parts will hereinafter appear in the detailed description to follow.

The invention is illustrated by way of example in the accompanying drawings, in which:—

Figure 1 is a partial perspective view of a motor vehicle showing the invention applied, Figure 2 is a longitudinal sectional view of the supporting apparatus for the shield and also showing in dotted lines the shield when swung to its non-operative position, Figure 3 is a sectional view taken substantially on the lines 3—3 of Figure 2, Figure 4 is a side view of the shield employed, Figure 5 is a detail view particularly illustrating the movable member for supporting the arm carrying the eye shield, and Figure 6 is a sectional view taken substantially on the line 6—6 of Figure 5.

Figure 7 is a detail view of a modified form of the movable member with the arm holding the shield shown in longitudinal section, Figure 8 is a view taken along the line 8—8 of Figure 7, and Figure 9 is a detail view of the arm of the shield particularly illustrating the lug employed in holding the shield in non-operative position.

Referring to the drawings more particularly, in Figure 1, 10 indicates generally the body of a motor vehicle, of which 11 is the front or driver's seat, 12 the windshield, 13 the top, and 14 the steering wheel.

In carrying out the present invention there is provided a pair of telescopic members 15 and 16, the member 16 being slidable within the member 15. The member 15 has one end flattened in the form of a disk 15", adapted to engage a bracket detachably secured by screws or the like to the forward frame member 18 to the top 13. Said bracket is provided with a base 17 having a pair of parallel lugs extending therefrom, between which the disk 15' is inserted and held in position by means of a bolt B passing therethrough. The member 16 also has one end flattened to form a disk 26 adapted to engage a second bracket 22 and maintained in position by a bolt 20, said second bracket being detachably secured by screws or the like to one of the intermediate cross ribs of the top.

Upon the tube 16 there is slidably mounted a sleeve 24 which may be adjustably held by the set screw 24'. The sleeve is provided with an enlargement 25 (Fig. 6) which is formed with an extension 27, said extension being in the form of a plate having its free edge rounded, and said plate carrying a bolt 28. The bolt 28 is provided with a squared portion 29 adjacent its head, as shown in Fig. 6, and this squared portion is disposed within the opening in the plate 27 accommodating said bolt and thereby to prevent turning movement of the bolt. There is further provided a plate member 30 which is formed with a suitable opening adapted to receive the bolt 28 and this plate is formed with a threaded extension 31 at the inner end of which there occurs a shoulder 32. A friction plate 33 is also provided which is formed with a suitable opening adapted to receive the bolt 38 and which has its upper edge 34 disposed to engage with the outer surface of the enlargement 25. The upper edge 34 of the plate 33 and the outer surface of the extension 25 cooperate to prevent turning movement of the plate 23. The bolt 28 also carries the spring washers 35 and a nut 36, said nut being preferably knurled as shown and to permit easy manual turning movement thereof.

The threaded plug portion 31 of plate 30 has secured thereon the one end of a tubular member 37, said member having threaded into its lower end an exteriorly threaded tubular member 38. In the lower end of the member 38 there is threaded a plug 39 formed upon a frame 40, said frame 40 carrying a panel or transparent material 41 which forms the eye shield. Between the plugs 39 and 31 there is interposed a coil spring 42 and also the member 37 carries a set screw 43, adapted to be utilized for locking the member 38 in the position desired.

The sleeve 24 carries a split sleeve member 46 which is made of resilient material and each end of this member is formed with an extension 48, said extensions each being provided with a semi-circular portion 49 adapted to fit upon the tube 37. The portion 49 of each extension occurs intermediate the length thereof and each portion 49 terminates in an outwardly flared extension 50 in order to facilitate positioning the tubular member 37 between said extensions. Also there is extended through the extensions 48 at a point adjacent the inner ends of said extensions a bolt 51 which carries a knurled nut 52 upon its one end, and interposed between this nut and the associated extension is a compression spring 53.

In the use of the present device or apparatus the same can be easily and quickly mounted in a motor vehicle having a top; that is, the members 15 and 16 may be adjusted so that the same will extend between the frame member 18 and body 23, and then these members may be secured in a position in the manner heretofore described. The tubular members 38 constitute an arm which carries the frame 40 and transparent panel 41 or in other words an arm which carries the eye shield and this arm is supported by the bolt 28 for rearward or forward swinging movement. Also the arm may be lengthened or shortened through manipulation of the set screw 43 and threaded tube 38, and in this way brought into the position desired with respect to the line of vision of the operator of the vehicle. Furthermore, the shield might be rotated and thereby obtain the correct angle therefor. It is particularly noted that with the employment of the friction plate 33 the arm supporting the eye shield including the members 37 and 38 can be rigidly and adjustably held in the desired position. Also if necessary the eye shield may be swung upwardly and the tube 17 brought to be engaged between the extensions 48 and thus releasably held. Furthermore, the sleeve 24 can be adjustably set by means of the set screw 24' and thus to additionally adjust the position of the eye shield.

Another form of the invention is shown illustrated by Figs. 7 to 9 inclusive, wherein I have provided a slidable bracket 24 carried by the rod 15, which may be solid if desired and upon which bracket is mounted the arm 37 holding the shield 41. The bracket has extensions 54 depending therefrom in alignment with the swingable arm 37, and upon which is arranged a lug 55 adapted to be inserted between the extensions 54, so that a thumb screw 56 may be inserted in the opening in one of the said extensions and through an opening in the lug 55 to maintain the device in inoperative position.

While I have shown and described the preferred form of my invention, I wish it to be understood that I am aware of the fact that the construction, combination and arrangement of parts may be changed by those skilled in the art without departing from the spirit of the invention, as indicated by the appended claims.

I claim:

1. In an apparatus of the class described, a pair of telescoping members arranged longitudinally of an automobile top and having their outer ends connected to a bow of said top, a glare shield adjustably supported from one of the telescoping members, said telescoping members being freely movable relative to each other whereby the bows will be permitted to move relative to each other.

2. In an apparatus of the class described, a pair of telescoping members arranged longitudinally of an automobile top and having their outer ends connected with a bow of said top, a glare shield adjustably supported from one of the telescoping members, a resilient clamp suspended from one of said telescoping members and adapted to engage the supporting member of the glare shield for locking said shield in an inoperative position.

JOHN WILLIAM PRIMROSE.